UNITED STATES PATENT OFFICE.

NICHOLAS LONGFEATHER, OF SYRACUSE, NEW YORK.

COMPOSITION FOR TREATING TREES.

1,028,233.  Specification of Letters Patent.  Patented June 4, 1912.

No Drawing.  Application filed October 12, 1911. Serial No. 654,422.

*To all whom it may concern:*

Be it known that I, NICHOLAS LONGFEATHER, of Syracuse, in the county of Onondaga, in the State of New York, have invented new and useful Improvements in Compositions for Treating Trees, &c., of which the following is a full, clear, and exact description.

This invention relates to a composition used in the art of forestry.

It is a well known fact that when trees and shrubs become diseased either by abrasion, natural decay or otherwise, it is necessary if the same are to be saved, to protect and stimulate temporarily the cambium layer till the bark forms over it to give it its natural protection, and my invention has therefore particular reference to a preparation for protecting and stimulating the cambium layer for the purposes above specified.

To that end therefore, this invention consists in the mixing and commingling of the several ingredients hereinafter set forth in substantially the proportions specified.

The composition consists of about 23% of white lead, and about 2% of zinc oxid represented by formula ZnO; about 60% of coal tar, the chemical formula of which it is hardly necessary to give, about 7½% of excreta, about 1% of pine gum and about 6½% of linseed oil.

The above composition and proportions have been found by actual experience and practice to have produced the most satisfactory results, although these proportions may be varied materially and goods results obtained.

It is not necessary to describe the method of application for the reason its application of the composition of various kinds is well known to those skilled in the art of forestry.

What I claim is:

1. A composition for treating trees consisting of white lead, zinc oxid, coal tar, excreta, pine gum and linseed oil throughly mixed and commingled to form a homogeneous mass.

2. A composition for treating trees consisting of white lead about 23%, zinc oxid about 2%, coal tar about 60%, excreta about 7½%, pine gum 1%, linseed oil 6½%, thoroughly mixed and commingled to form a homogeneous mass.

In witness whereof, I have hereunto set my hand this 10 day of October 1911.

NICHOLAS LONGFEATHER.

Witnesses:
HOWARD P. DENISON,
EUGENE A. THOMPSON.